United States Patent [19]

Re

[11] Patent Number: 4,621,544

[45] Date of Patent: Nov. 11, 1986

[54] ADJUSTABLE FULLY AUTOMATIC VACUUM MODULATOR CONTROL FOR AUTOMATIC TRANSMISSION HAVING A VACUUM MODULATOR

[75] Inventor: Ronald Re, Newark, Del.

[73] Assignee: Tran-Saver, Inc., Cleveland, Ohio

[21] Appl. No.: 625,701

[22] Filed: Jun. 28, 1984

[51] Int. Cl.⁴ .............................................. B60K 41/04
[52] U.S. Cl. .......................................... 74/863; 74/868; 74/877; 74/856; 137/494; 137/907
[58] Field of Search ................. 74/863, 856, 843, 877, 74/868; 137/DIG. 8, 494, 498

[56] References Cited

U.S. PATENT DOCUMENTS

| | | | |
|---|---|---|---|
| 1,532,907 | 4/1925 | Long | 137/494 |
| 2,575,891 | 11/1951 | Price | 74/877 |
| 3,599,513 | 8/1971 | Buno | 74/863 X |
| 3,765,273 | 10/1973 | Re | 74/865 |
| 3,768,339 | 10/1973 | Kolehmainen et al. | 74/843 X |
| 4,142,427 | 3/1979 | Grevich | 74/863 |
| 4,187,742 | 2/1980 | Achard | 74/863 |
| 4,284,261 | 8/1981 | Benjamin et al. | 137/DIG. 8 X |
| 4,334,441 | 6/1982 | Iwanaga et al. | 74/868 |
| 4,367,662 | 1/1983 | Greene | 74/863 |
| 4,416,307 | 11/1983 | Detweiler | 137/DIG.8 X |

FOREIGN PATENT DOCUMENTS

| | | | |
|---|---|---|---|
| 220961 | 4/1959 | Australia | 137/498 |
| 1007899 | 5/1952 | France | 137/498 |

Primary Examiner—Kenneth J. Dorner
Assistant Examiner—Dwight G. Diehl
Attorney, Agent, or Firm—Connolly and Hutz

[57] ABSTRACT

An adjustable fully automatic vacuum modulator control, for use in vehicles having automatic transmission with a vacuum modulator includes a cylinder which contains a slidable piston and front face having an adjustable stop to regulate the vacuum flow. Three ports communicate with the interior of the cylinder and the position of the piston changes during conditions of acceleration and deceleration.

6 Claims, 7 Drawing Figures

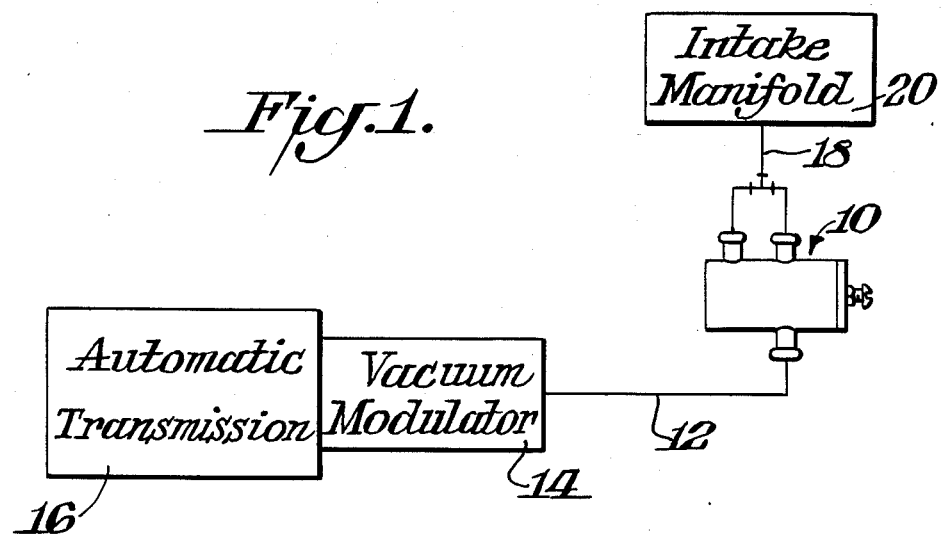
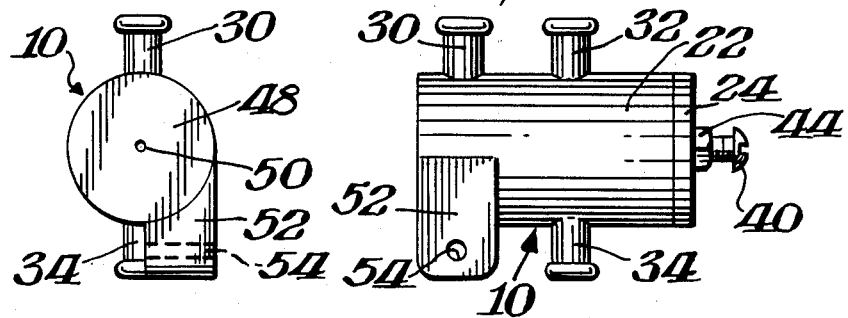
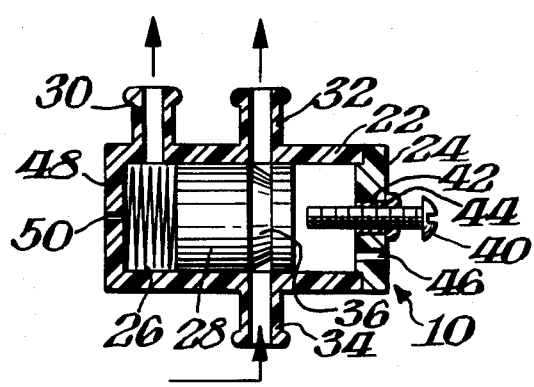
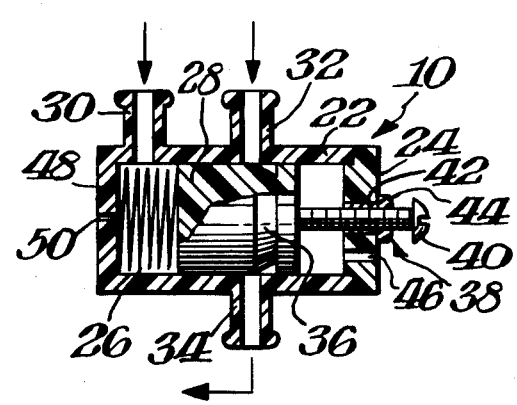

ADJUSTABLE FULLY AUTOMATIC VACUUM MODULATOR CONTROL FOR AUTOMATIC TRANSMISSION HAVING A VACUUM MODULATOR

BACKGROUND OF THE INVENTION

In my U.S. Pat. No. 3,765,273 I disclosed a vacuum modulator control for use in vehicles having automatic transmission. The vacuum modulator control of that patent has been effective. Because of its design, however, the control was mechanically achieved off the power linkage. In addition, the control did not lend itself to universal usage because it required mounting on the engine in line with the power linkage. This application is not practical to the newer vehicle because of increased changes in engine designs.

SUMMARY OF THE INVENTION

An object of this invention is to provide an improved vacuum modulator control based upon the concepts set forth in my earlier patent but on which operates automatically off the vacuum line.

A further object of this invention is to provide such a vacuum modulator control which could be universal in application and thus readily lend itself to being added to standard vehicles without requiring any special mounting to the engine. It may be mounted anywhere in the engine compartment.

In accordance with this invention, the vehicle modulator control includes a cylinder which contains a slidable piston. The cylinder includes three ports. Two of the ports are connected to the intake manifold of the vehicle and the third port is connected to the vacuum modulator. In this manner the control 10 can be mounted anywhere under the vehicle hood.

In a preferred form of this invention the cylinder includes an adjustable stop for controlling the extent of movement of the piston. The adjustable stop may take any suitable form such as a screw or bolt threaded through an end face of the cylinder.

THE DRAWINGS

FIG. 1 is a schematic view of a hydraulic fluid system which incorporates the vacuum modulator control of this invention;

FIG. 2 is a side elevation view of the vacuum modulator control shown in FIG. 1;

FIG. 3 is a top plan view of the vacuum modulator control shown in FIG. 2;

FIGS. 4-5 are end elevation views of the vacuum modulator control shown in FIGS. 2-3;

FIG. 6 is a cross-sectional view taken through FIG. 3 along the line 6—6; and

FIG. 7 is a cross-sectional view similar to FIG. 6 in a different phase of operation.

DETAILED DESCRIPTION

As indicated above, the present invention is based upon the concepts set forth in my earlier U.S. Pat. No. 3,765,273, the details of which are incorporated herein by reference thereto.

As shown in FIG. 1, the vacuum modulator control 10 is mounted to the line 12 leading to the vacuum modulator 14 of the automatic transmission system 16. The vacuum modulator control 10 also communicates through line 18 to the intake manifold 20 of the vehicle.

FIGS. 2-7 illustrate the details of control 10. As indicated therein, control 10 is in the form of a cylinder 22 having a front face 24. During assembly, a spring 26 is inserted into cylinder 22 and then piston 28 is inserted into the cylinder 22. End face 24 is then attached in any suitable manner.

A pair of ports 30, 32 are provided for cylinder 22 and communicate with intake manifold 20 through line 18. A third port 34 communicates with the vacuum modulator through line 12.

As shown in FIGS. 6-7, piston 28 includes a tapered groove 36. The front end face 24 has secured thereto a manually adjustable stop 38. In a preferred form of this invention, the adjustable stop 38 is in the form of a bolt 40 which threadably extends through end face 24 in threaded engagement with insert 42. A lock nut 44 is provided to maintain bolt 40 in position once a setting has been made.

In operation during deceleration as shown in FIG. 6, flow would be through line 12 into port 34 around groove 36 and out of port 32 to the intake manifold 20. Any air in the rearward side of piston 28 would be expelled through port 30. It is also noted that front face 24 includes a vent 46 while the rear face 48 includes a smaller vent 50. In the decelerating condition illustrated in FIG. 6, the sliding movement of piston 28 is such that it urges against and compresses spring 26.

As the vehicle is initially accelerated, the automatic transmission shifts from a low gear to a higher gear when the maximum hydraulic fluid pressure is applied. Thus conditions are shown in FIG. 7 where the vacuum causes flow from intake manifold 20 through port 30 thus urging piston 28 toward the front face aided by spring 26. The movement of piston 28 toward the front face 24 is limited by the position or setting of bolt 40. Thus piston 28 moves toward the front face 24 until it contacts bolt 40. Outward flow from the front portion of cylinder 22 would be through vent 46. Flow would bleed off through the portion of groove 36 communicating with port 34.

When the vehicle is again decelerated, the vacuum is gradually applied which causes the hydraulic fluid pressure to decrease and the gears shift from high to low.

Control 10 is particularly advantageous as part of a preventive maintenance program. Ideally, control 10 could be part of the original vehicle equipment. The ease with which control 10 may be mounted into the vacuum line, however, permits control 10 to be conveniently mounted after the vehicle has been used and particularly should be applied once slippage starts. In the absence of a control such as control 10, the automatic transmission life would rapidly decrease when slippage begins. Control 10, however, prevents such rapid deterioration of the automatic transmission and should thereby greatly prolong its life.

As shown in FIG. 2, cylinder 22 includes a tab 52 with an opening 54. (For the sake of clarity tab 52 is omitted from the other Figures.) Tab 52 provides a convenient member to facilitating mounting device 10 to the hood or at any other suitable location.

Control 10 is characterized by its simplicity without detracting from its effectiveness. For example, control 10 utilizes minimal parts including stardard hardware equipment such as bolt 40 and lock nut 44. Ports, 30, 32, 34 are so constructed that conventional lines may be snapped over the ports and secured in any suitable manner. The setting of bolt 40 may be conveniently done with a conventional screw driver. The precise setting could be made on a trial and error basis in accordance with the desired stroke of piston 28. As can be appreciated, control 10 thus provides an economical and convenient means of prolonging the life of an automatic transmission and facilitates the preventive maintenance program of a vehicle.

Control 10 may be used with any multi-gear transmission, not simply a two gear. Control 10 provides an effective device for automatically permitting a smooth shifting from one gear to another.

What is claimed is:

1. In a multispeed automatic transmission system for vehicles having transmission gears which shift from low to high to low in response to the acceleration and deceleration of the vehicle wherein a vacuum modulator control is mounted in the vacuum line between the vacuum modulator and the intake manifold, the improvement being said vacuum modulator control adapted for mounting at any desired location in the engine compartment comprising a cylinder, a piston slidably positioned in said cylinder, said cylinder having a front end face and a rear end face and a peripheral surface, resilient means in said cylinder for urging said piston toward one of said end faces, stop means in said cylinder remote from said resilient means limiting the amount of movement of said piston in said cylinder, a first port communicating with the interior of said cylinder through said peripheral surface, said first port communicating with the vacuum modulator, second and third ports communicating with the interior of said cylinder through said peripheral surface, said second and third ports communicating with the intake manifold whereby during deceleration air flows into said cylinder through said first port and exits from said cylinder through said second and third ports with said piston being urged against said resilient means and whereby during acceleration air flows into said cylinder through said second and third ports and exits form said first port with said piston being urged away from said resilient means, said piston including a peripheral groove creating flow communication between said first and second ports, and said first and second and third ports and said piston and said peripheral groove being spaced and dimensioned with respect to each other and with respect to said stop means whereby said first and second ports are always in flow communication with each other and open ranging from a fully open to a bleed condition regardless of the position of said piston and said third port is always open regardless of the position of said piston.

2. The transmission system of claim 1 wherein said first and said second ports are axially aligned.

3. The transmission system of claim 1 wherein said means comprises adjustable stop means mounted in said front end face of said cylinder located remote from said resilient means.

4. The transmission system of claim 3 wherein said adjustable stop means includes a threaded member extending through said front end face and into said cylinder.

5. The transmission system of claim 4 wherein said threaded member is a bolt threadably engaged with a threaded insert, said threaded insert being secured to said remote face and a lock nut being threadably engaged with said bolt.

6. The transmission system of claim 5 wherein said first and said second ports are axially aligned.

* * * * *